(12) United States Patent
Desjardins

(10) Patent No.: US 11,043,110 B2
(45) Date of Patent: Jun. 22, 2021

(54) INTERCONNECTING DETECTOR AND METHOD PROVIDING LOCATING CAPABILITIES

(71) Applicant: Pierre Desjardins, St-Hippolyte (CA)

(72) Inventor: Pierre Desjardins, St-Hippolyte (CA)

( * ) Notice: Subject to any disclaimer, the term of this patent is extended or adjusted under 35 U.S.C. 154(b) by 0 days.

(21) Appl. No.: 16/801,211

(22) Filed: Feb. 26, 2020

(65) Prior Publication Data

US 2020/0273321 A1   Aug. 27, 2020

Related U.S. Application Data

(60) Provisional application No. 62/810,985, filed on Feb. 27, 2019.

(51) Int. Cl.
| | |
|---|---|
| *G08B 25/10* | (2006.01) |
| *G08B 17/10* | (2006.01) |
| *G08B 25/00* | (2006.01) |
| *H04W 4/80* | (2018.01) |

(52) U.S. Cl.
CPC .............. *G08B 25/10* (2013.01); *G08B 17/10* (2013.01); *G08B 25/009* (2013.01); *H04W 4/80* (2018.02)

(58) Field of Classification Search
CPC ..... G06F 11/3404; G08B 25/10; G08B 7/006; G08B 7/062; G08B 17/08; G08B 17/10; G08B 25/009; G08B 3/10; G08B 1/08; H04W 4/80; H04W 4/33; H04W 4/38; H04L 67/125; H04L 12/28; G10L 25/48; G10L 25/27; G01S 3/8006
See application file for complete search history.

(56) References Cited

U.S. PATENT DOCUMENTS

| | | | | |
|---|---|---|---|---|
| 10,805,775 | B2* | 10/2020 | Castor ................... | H04W 64/00 |
| 2007/0146127 | A1* | 6/2007 | Stilp ........................ | G08B 1/08 |
| | | | | 340/531 |
| 2014/0269199 | A1* | 9/2014 | Weldon ..................... | G01S 5/18 |
| | | | | 367/124 |
| 2015/0221321 | A1* | 8/2015 | Christian ................ | G10L 25/27 |
| | | | | 700/94 |
| 2016/0232774 | A1* | 8/2016 | Noland .............. | G08B 21/0438 |
| 2017/0154638 | A1* | 6/2017 | Hwang ................... | G01S 3/803 |
| 2017/0180926 | A1* | 6/2017 | Doherty ................ | H04W 24/02 |
| 2018/0074162 | A1* | 3/2018 | Jones ........................ | G01S 5/30 |

(Continued)

*Primary Examiner* — An T Nguyen
(74) *Attorney, Agent, or Firm* — IP Delta Plus Inc.

(57) ABSTRACT

Detector and method providing locating capabilities. A sound capture module of the detector captures sound in a vicinity of the detector and generates a digitalized captured sound based on the captured sound. The detector generates a digital sound message, including a unique identifier of the detector, from the digitalized captured sound. A wireless communication module of the detector wirelessly communicates the digital sound message with the unique identifier of the detector, to a monitoring station. The sound capture module comprises a digital microphone, or alternatively an analog microphone and an analog to digital converter. The detector also receives a remotely captured sound from another detector. The detector generates and wirelessly transmits a digital sound message based on the remotely captured sound to the monitoring station, or compares an amplitude of the remotely captured sound with an amplitude of a locally captured sound generated by the sound capture module.

22 Claims, 9 Drawing Sheets

(56) References Cited

U.S. PATENT DOCUMENTS

| | | | |
|---|---|---|---|
| 2019/0295397 A1* | 9/2019 | Eckert | G08B 15/00 |
| 2020/0143649 A1* | 5/2020 | Coonley | G08B 13/1672 |
| 2020/0278239 A1* | 9/2020 | Jax | G01H 3/08 |

* cited by examiner

INTERCONNECTING DETECTOR AND METHOD PROVIDING LOCATING CAPABILITIES

TECHNICAL FIELD

The present specification relates to a detector, which communicates with a monitoring station, and acts as a proxy for another detector connected thereto to assist in locating victims in a building.

BACKGROUND

Smoke detectors are mandatory safety devices for residential, commercial and industrial buildings. In the first years following their introduction, residential owners and apartment dwellers used to install one battery-operated stand-alone smoke detector per home or apartment. Although better than no smoke detector, the installation of one battery-operated stand-alone smoke detector did not suffice to address on its own the problems resulting from residential fires.

The Life Safety Code® from the National Fire Protection Association 101 (NFPA 101) defines the standard for fire protection in homes. The standard has evolved over the years, and now requires that every new home be equipped with one smoke detector in every bedroom, hallway and floor. Furthermore, the standard requires that at least one smoke detector be connected to AC power, and that the smoke detectors be interconnected, so that if one smoke detector goes off, that all the smoke detectors interconnected therewith go off as well.

NFPA 101 defines the number, types and location of smoke detectors to be installed. Those guidelines include the installation of at least one AC powered smoke detector. UL/ULC™ is the organization that defines the standards and provides certification to manufacturers of electrically powered products, including smoke detectors. Since 1988, UL/ULC™ has established that all electrically powered products should be provided with a three-wire connection: a feed, a neutral and a data wire. Installation of three-wire connection electrical products, including smoke detectors, must be performed by an electrician. Thus, adding one or several UL/ULC™ smoke detectors require the services of an electrician, prohibiting further the installation of such smoke detectors.

In addition to NFPA 101's established standard and UL/ULC™ standards, Public Safety Services (PSS) recommends connecting one of the interconnected smoke detectors to a UL/ULC™ certified monitoring station. Monitoring stations are usually private organisations specialising in receiving and monitoring burglar and fire alarms. Properly staffed to support continuous 24 hours a day, seven days a week monitoring, these monitoring stations receive and manage each alarm received. For example, when a smoke detector alarm signal is received at the monitoring station, an operator of the monitoring station may first attempt to call the home from which the smoke detector alarm signal is received, before calling a city fire department or emergency services such as 9-1-1.

However, connecting one smoke detector to a UL/ULC™ certified monitoring station requires the addition of: a security system, 12-24Vdc smoke detectors or one 12-24Vdc smoke detector wirelessly interconnected with battery-operated smoke detector(s). Thus, connecting one of the interconnected smoke detectors to the UL/ULC™ certified monitoring station is quite expensive, time consuming, and requires the further installation of a security system panel and keypad.

As NFPA 101 requires that smoke detectors be replaced every 10 years, home owners who connect their smoke detectors with one of the monitoring stations has to replace the smoke detectors not connected to the monitoring station as well as the smoke detector(s) connected to the monitoring station, thus increasing the costs of such replacements.

U.S. Pat. No. 9,875,631 describes a two-wire smoke detector that is AC powered, includes batteries for power outages period, and includes a Wi-Fi communication unit. However, the two-wire electrical connection of this two-wire smoke detector lacks the mandatory requirement of third wire interconnection set by UL/ULC™, and therefore cannot be used to replace existing electrically powered smoke detectors in homes built after 1988. Furthermore, the two-wire smoke detector described in U.S. Pat. No. 9,875,631 relies on a proprietary electrical power connector that is incompatible with existing connectors and requires the replacement of the existing power harnesses by a qualified electrician. Moreover, the Wi-Fi communication unit described sends text messages to a smartphone and cannot be connected a UL/ULC™ monitoring station. Furthermore, as 49% of home fires involved an electrical failure, and most Wi-Fi users do not protect their Internet equipment with a battery back-up, the Wi-Fi connection proposed by U.S. Pat. No. 9,875,631 is not sufficiently reliable and does not alleviate many of the current problems.

BRK™ offers through its SA520B series a wireless alarm-bridge electrically powered detector including a wire and wireless interconnection. However, the SA520B series is not adapted for transmitting alarms to a UL/ULC™ monitoring station.

There is therefore a need for an AC three-wire powered and interconnectable detector, adapted to communicate with a UL/ULC™ certified monitoring station.

There is also a need for a detector and a method providing assistance in locating victims.

SUMMARY

According to a first aspect, the present disclosure relates to a detector comprising a sound capture module generating a digitalized captured sound, a processor, and a wireless communication module. The sound capture module comprises a microphone for capturing sound in a vicinity of the detector, the digitalized captured sound being based on the sound captured by the microphone. The processor receives the digitalized captured sound and generates therefrom a digital sound message including a unique identifier of the detector. The wireless communication module wirelessly communicates the digital sound message with the unique identifier of the detector, to a monitoring station.

According to a second aspect, the present disclosure relates to a method for providing locating capabilities to a detector. The method comprises capturing sound in a vicinity of the detector, by a sound capture module of the detector. The method comprises generating, by the sound capture module, a digitalized captured sound based on the captured sound. The method comprises generating, by a processor of the detector, a digital sound message from the digitalized captured sound. The digital sound message includes a unique identifier of the detector. The method comprises wirelessly communicating, by a wireless communication module of the detector, the digital sound message with the unique identifier of the detector, to a monitoring station.

In accordance with a particular aspect, the microphone consists of an analog microphone and the sound capture module further comprises an analog to digital converter for digitalizing the sound captured by the analog microphone into the digitalized captured sound.

In accordance with another particular aspect, the microphone consists of a digital microphone and the digital microphone digitalizes the sound captured by the digital microphone into the digitalized captured sound.

In accordance with still another particular aspect, a captured sound is received from another detector via one of the wireless communication module or a data link connecting the detector to the other detector. The captured sound from the other detector consists of a digitalized captured sound of the other detector. Alternatively, the captured sound from the other detector is digitalized by an analog to digital converter into the digitalized captured sound of the other detector. The processor generates a digital sound message from the digitalized captured sound of the other detector. The digital sound message includes a unique identifier of the other detector. The wireless communication module wirelessly communicates the digital sound message with the unique identifier of the other detector, to the monitoring station.

In accordance with yet another particular aspect, a remotely captured sound is received from another detector via one of the wireless communication module or a data link connecting the detector to the other detector. An amplitude of a locally captured sound generated by the sound capture module is compared to an amplitude of the remotely captured sound of the other detector, to identify the captured sound with the greatest amplitude. A probable location message is generated by the processor. The probable location message includes a unique identifier of the detector which captured the sound having the greatest amplitude. The wireless communication module wirelessly communicates the probable location message with the unique identifier of the detector which captured the sound having the greatest amplitude, to the monitoring station. Optionally, a digital version of the captured sound having the greatest amplitude is included to the probable location message.

In accordance with another particular aspect, the processor synchronizes capturing sound at the microphone of the sound capture module and at the other detector.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure address the drawbacks of current detectors, and more particularly, the needs for having a detector that communicates directly with a monitoring station.

The following terminology is used throughout the present disclosure:
  Detector: Means any of a smoke detector, a carbon monoxide detector, or a combined smoke and carbon monoxide detector.
  Monitoring station: Means any of a surveillance station, an emergency dispatch office, public-safety answering point, fire stations, proprietary web service, etc.
  Residence: a building or area in a building for human occupation or activities, such as for example a house, a condo, an apartment, an office, a store, a warehouse, etc.

Figure 1:
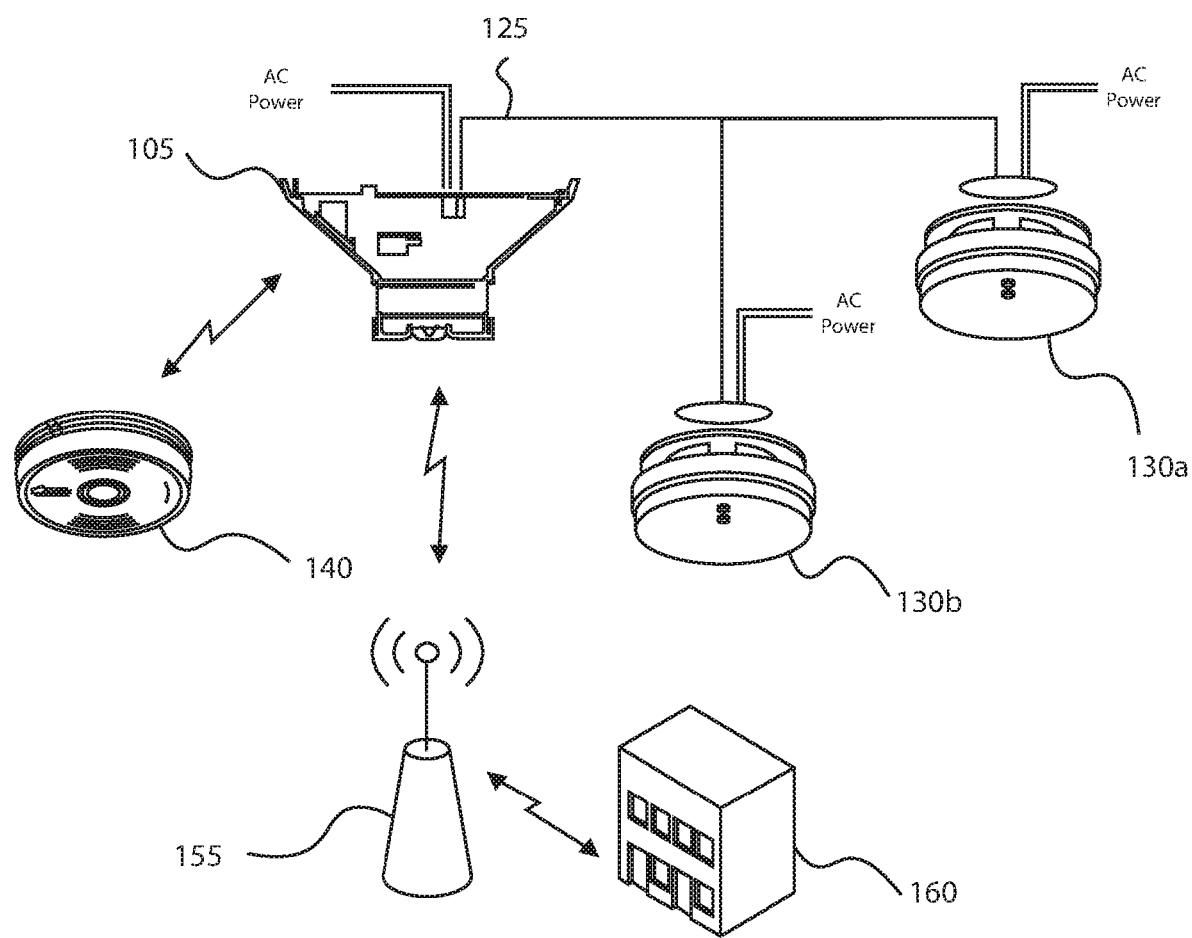
FIG. 1 an exemplary installation of a detector 105 in accordance with the present invention

Referring to FIG. 1, there is depicted a detector 105 in accordance with an exemplary installation. The exemplary installation is for illustration purposes only and could include more or less components as well as different types of components, without departing from the scope of the present description. The exemplary installation comprises a detector 105. In the exemplary installation shown on FIG. 1, the detector 105 is shown as being electrically connected to a data link 125 shared with two detectors 130a and 130b. The exemplary installation may further comprise a wireless detector 140 which wirelessly communicates with the detector 105. Although not shown on FIG. 1, the detector 105 could be a stand-alone detector. Alternatively or concurrently, the detector 105 could further wirelessly communicate with any type of device other than a wireless detector (though for conciseness purposes, the present specification will use the expression wireless detector to include any type of wireless device and not only literally wireless detector). In the exemplary installation shown on FIG. 1, the detector 105 communicates over cellular link to a cellular network access point 155 such as a cellular antenna. The detector 105 communicates with the cellular network access point 155 using any known cellular technology such as 2G, 3G, 4G, 5G, LTE, GSM etc. The cellular network access point 155 communicates directly or indirectly through an Internet network with a monitoring station 160.

The detectors 105, 130a and 130b are depicted as each receiving AC power from an AC power source, while the detector 140 is shown as being battery powered. However, each or all of the detectors 105, 130a, 130b and 140 could be either powered by AC, battery, or a combination of AC and battery.

Figure 2:
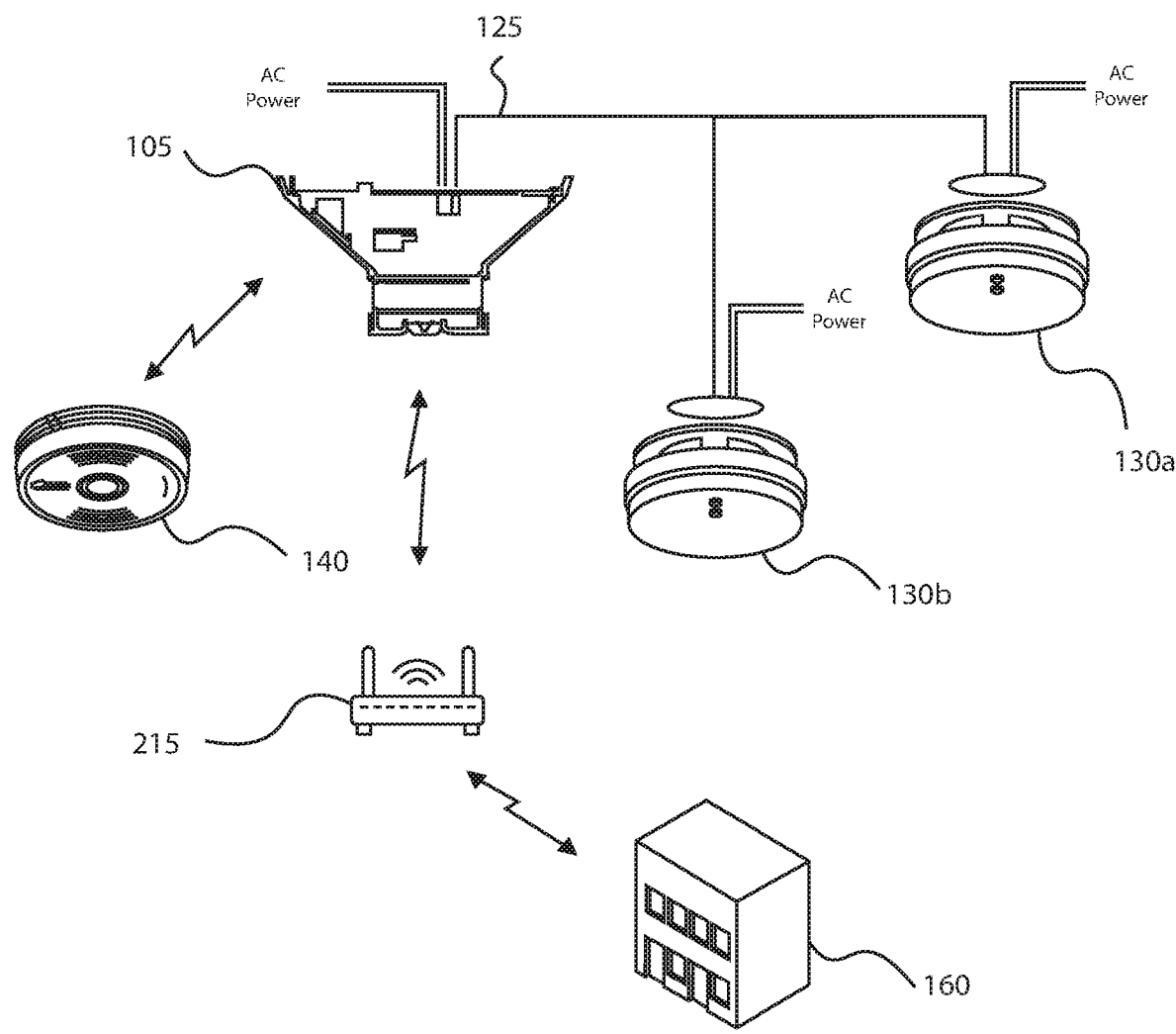
FIG. 2 is another exemplary installation of the detector 105.

Referring to FIG. 2, another exemplary installation of the detector 105 is shown. In the exemplary installation of FIG. 2, the detector 105 communicates with the monitoring station 160 over a Wi-Fi connection through a wireless network access point 215. The detector 105 communicates with the wireless network access point 215 using any known data protocol such as for example Wi-Fi technology (i.e. 802.11, 802.11a, 802.11b, 802.11g, 802.11n, 802.11ac etc.) or any other standardized or proprietary data protocol. The detector 105 may communicate with the wireless network access point 215 using a secured data protocol such as for example: encryption and/or Virtual Private Network. The wireless network access point 215 communicates with the monitoring station 160 using an IP protocol such as for example IPv4, IPv6 of any other similar protocol which can be carried over an Internet Network.

Figure 3:
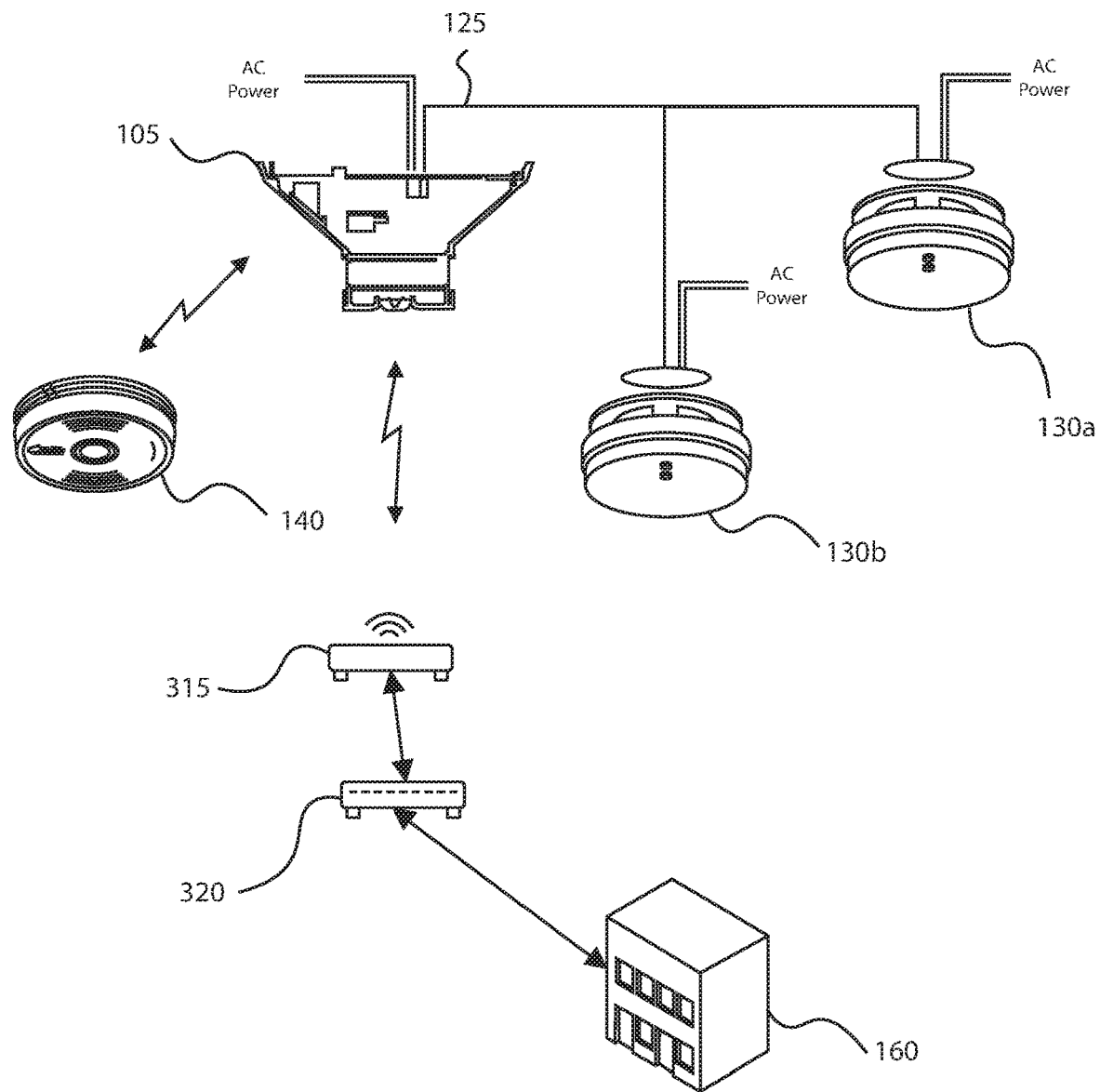
FIG. 3 is yet another exemplary installation of the detector 105.

Referring to FIG. 3, there is shown yet another exemplary installation of the detector 105. In the exemplary installation of FIG. 3, the detector 105 communicates over a wireless proprietary connection with a proprietary wireless network access point 315. The proprietary wireless network access point 315 may communicate wirelessly with the monitoring station 150 or may be hardwired to an internet router 320 for wired communication with the monitoring station 160. The internet router 320 communicates with the monitoring station 160 using an IP protocol such as IPv4, IPv6 of any other similar protocol which can be carried over an Internet Network. Alternatively, the detector 105 may communicate using any other RF technology which is secured and standardized.

Although the exemplary installations depicted in FIGS. 1-3 are illustrated as three separate exemplary installations, the present description is not limited to such three exemplary installations. The depicted exemplary installations could be combined or grouped so as to provide several variants of the exemplary installations.

Figure 4:
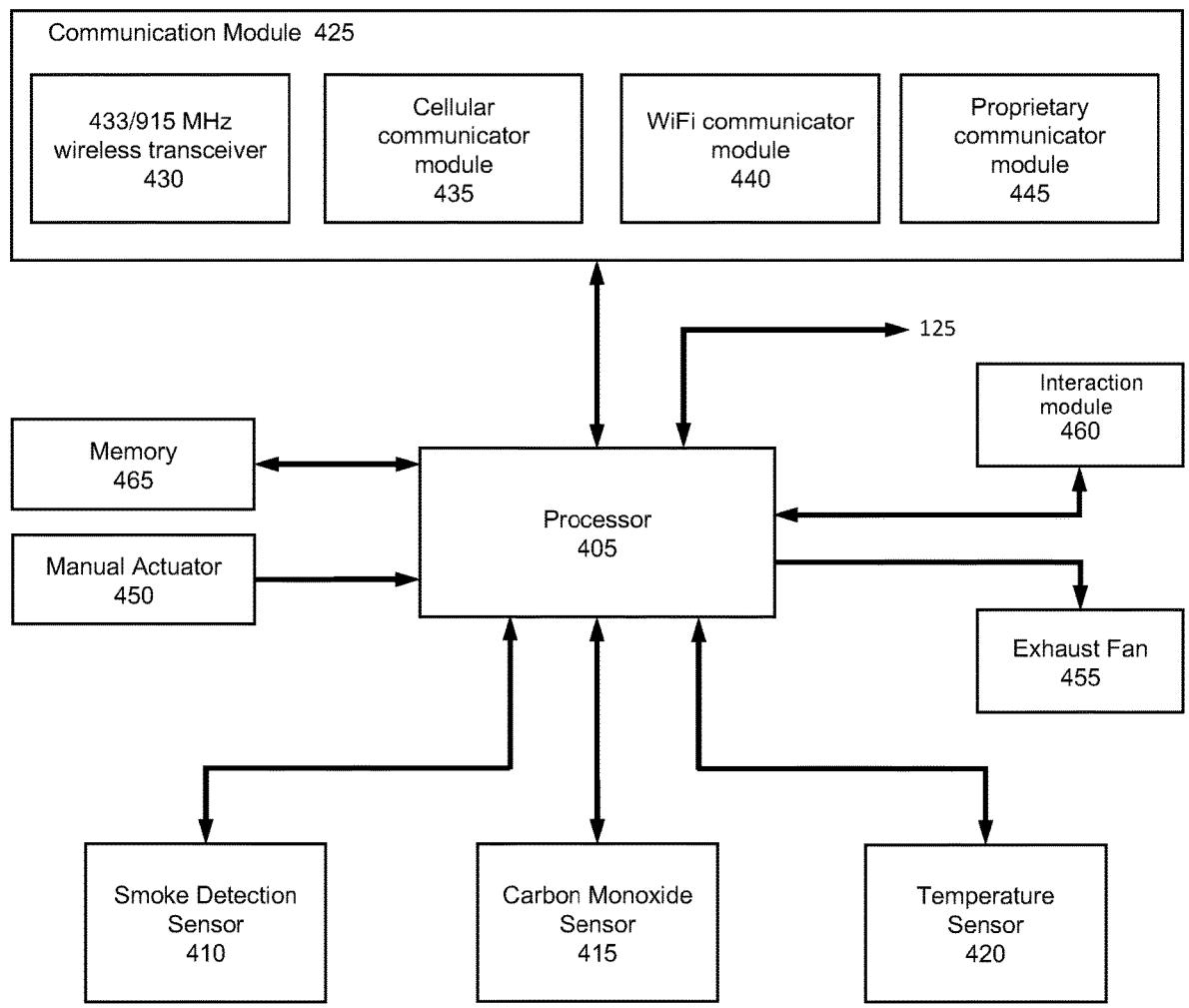
FIG. 4 is a functional block diagram of the detector 105.

Reference is now made concurrently to FIGS. 1-4, where FIG. 4 shows a functional block diagram of the detector 105. The detector 105 comprises a processor 405, a communication module 425, an interaction module 460 and at least one of: a smoke detection sensor 410, a carbon monoxide sensor 415, and a temperature sensor 420. The detector 105 further comprises a manual actuator 450, an exhaust fan 455 and memory 465. The communication module 425 comprises and at least one of the following modules: a 433/915 MHz wireless transceiver 430, a cellular module 435, a Wi-Fi module 440 and a RF proprietary module 445.

The processor 405 may be any type of electronic component with processing capabilities, such as for example one or several parallel general-purpose processor(s), one or several parallel microprocessor(s) or microcontroller(s), Field Programmable Gate Array(s) (FPGA), Application Specific Integrated Circuit (ASIC), etc. or a combination thereof. The processor 405 executes a computer-implemented program for controlling operations of the detector 105. The processor 405 relies on predetermined thresholds, addresses and identifiers stored in the memory 465 when executing the computer-implemented program. Although not specifically described herein, it will be apparent to those skilled in the art that the processor 405 and the memory 465 are secured to prevent physical and electronic tampering, either local or remote.

The memory 465 may be include one or several types of memory known in the electronic industry, such as for example volatile memory (Random Access Memory (RAM), etc.), and non-volatile memory (Read-Only Memory (ROM), Erasable Programmable Read-Only Memory (EPROM), Electric Erasable Programmable Read-Only Memory (EEPROM), Flash Memory, etc.) or a combination thereof. The memory 465 stores predetermined thresholds for each of the smoke detection sensor 415, carbon monoxide sensor 415 and temperature sensor 420.

The memory further stores the addresses and identifiers for allowing the detector 105 to communicate with the wired detectors 130a and 130b, the wireless detector 140 and the monitoring station 160. More particularly, the memory stores the following addresses and identifiers:

TABLE 2

| Type | Description | Example |
|---|---|---|
| Device ID | 8-digit number provided during production | 12345678 |
| House ID | 8-digit number shared by the other detectors 105 in the same residence. This 8-digit number is configured upon installation and corresponds to the Device ID of the first detector 105 installed in the residence. | 12345678 |
| Neighbor(s) ID(s) | 8-digit number configured upon installation. The Neighbor(s) ID(s) is automatically obtained through an advertising/response procedure described later. | 12345678 |
| Source IP Address | an IPv4 or IPv6 address obtained via a Dynamic Host Configuration Protocol procedure through Wi-Fi or a cellular network | |
| Monitoring station Addresses 1 | First address to be used when communicating with the monitoring station. Programmed before installation. The Monitoring station Address 1 comprises a group of addresses, such as an IPv6 address, a cellular phone data address, and an RF proprietary address. | IPv4 or IPv6 on Transmission Control Protocol (TCP), based on standard NG9-1-1, Security Information Management Systems (SIMS) protocol or a proprietary protocol. |
| Monitoring station Addresses 2 | Second address to be used when communicating with the monitoring station. Programmed before installation. The Monitoring station Address 2 comprises a group of addresses, such as an IPv6 address, a cellular phone data address, and an RF proprietary address. | IPv4 or IPv6 on Transmission Control Protocol (TCP), based on standard NG9-1-1, Security Information Management Systems (SIMS) protocol or a proprietary protocol. |
| Monitoring station Addresses - Severe instances | Address to be additionally used when the severity of the alarm is high. Programmed before installation | IPv4 or IPv6 on Transmission Control Protocol (TCP), based on standard NG9-1-1, Security Information Management Systems (SIMS) protocol or a proprietary protocol. |

The communication module 425 may comprise one or several of the following modules: a 433/915 MHz wireless transceiver 430, a cellular module 435, a Wi-Fi module 440 and an RF proprietary module 445. The 433/915 MHz wireless transceiver 430, the cellular module 435, the Wi-Fi module 440 and the RF proprietary module 445 may be provided and fully configured for communication upon production of the detector 105. Alternatively, the 433/915 MHz wireless transceiver 430, the cellular module 435, the Wi-Fi module 440 and the RF proprietary module 445 may be provided upon production of the detector 105 and configured upon installation or selling of the detector 105. Additionally, the cellular module 435 may comprise an access door (not shown) for inserting a Subscriber Identity Module (SIM) card for allowing the cellular module 435 to communicate with proximate cellular antennas.

The 433/915 MHz wireless transceiver 430 is used for transceiving with proximate wireless detector(s) 140, in accordance with protocols and messages adopted by the industry. Messages exchanged on the 433/915 MHz wireless transceiver 430 are generated by the processor 405 or forwarded from the wired detectors 130a and 130b by the processor 405, and include the Device ID, and one or several of the following information: an indication as to whether the detected measure received from the smoke detection sensor 410 is above the predetermined threshold, an indication as to whether the detected measure received from the carbon monoxide sensor 415 is above the predetermined threshold, an indication to restore the previously sent indications of detected measures received from the smoke detection sensor 410 and the carbon monoxide sensor 415, a floor in which the detected measure received is above the predetermined threshold (when available), and a room identifier in which the detected measure received above the predetermined threshold has been received (when available).

The cellular module 435 communicates with the monitoring station 160 using any known cellular standard or protocol, such as for example: GSM, UMTS, 2G, 3G, 4G, 5G, LTE or any other standard or protocol for cellular communications. To that effect, the cellular module is provided with a SIM card. The SIM card provides a unique identifier (referred to as a SIM card number) for the cellular module 435. Before delivery or upon installation of the detector 105, Monitoring station Addresses 1 and Monitoring station Addresses 2 are stored in the memory 465. The cellular module 435 starts communicating with the monitoring station 160 by using the Monitoring station Address 1 corresponding to the cellular module 435. When a cellular communication cannot be established using the Monitoring station Address 1 corresponding to the cellular module 435, the cellular module 435 cellularly communicates with the monitoring station 160 using the Monitoring station Address 2 corresponding to the cellular module 435 stored in the memory 465. The cellular module 435 reports to the processor 405 and to the monitoring station 160 that cellular communication using the Monitoring station Address 1 corresponding to the cellular module 435 stored in the memory 465 could not be established or successfully completed. The messages generated by the processor 405 and sent by the cellular module 435 to the monitoring station 160 comprise a Monitoring station Address (1 or 2) and a Device ID. The messages generated by the processor 405 and sent by the cellular module 435 may further comprise one or several of the following: a House ID, a battery level, a date of production of the detector, the detected measure received from the smoke detection sensor 410, the detected measure received from the carbon monoxide sensor 415, the detected temperature received from the temperature sensor 420, and any other data which may be relevant to the monitoring station 160 for determining the best course of action. The cellular module 435 may further receive messages from the monitoring station 160. The messages received from the monitoring station 160 are automatically passed to the processor 405 for execution. For example, depending on the values of battery level, date of production of the detector, the detected measure received from the smoke detection sensor 410, the detected measure received from the carbon monoxide sensor 415 and the detected temperature received from the temperature sensor 420, the monitoring station 160 may instruct the processor to actuate the exhaust fan 455 to perform one of several purging cycles before instructing the smoke detection sensor 410, the carbon monoxide sensor 415 and the temperature sensor 420 to detect new respective measures.

The Wi-Fi module 440 wirelessly communicates with the monitoring station 160 using one of the following protocols: IPv4, IPv6, a monitoring station specific standard protocol, an Ethernet protocol or a proprietary protocol. The Wi-Fi module 440 starts wirelessly communicating with the monitoring station 160 by using the Monitoring station Address 1 corresponding to the Wi-Fi module 440. When a wireless communication cannot be established using the Monitoring station Address 1 corresponding to the Wi-Fi module 440, the Wi-Fi module 440 wirelessly communicates with the monitoring station 160 using the Monitoring station Address 2 corresponding to the Wi-Fi module 440 stored in the memory 465. The Wi-Fi module 440 reports to the processor 405 and to the monitoring station 160 that wireless communication using the Monitoring station Address 1 corresponding to the Wi-Fi module 440 stored in the memory 465 could not be established or successfully completed. The messages generated by the processor 405 and sent by the Wi-Fi module 440 to the monitoring station 160 comprise the Monitoring station Address (1 or 2) and a Device ID. The messages generated by the processor 405 and sent by the Wi-Fi module 440 may further comprise one or several of the following: a House ID, a battery level, a date of production of the detector, the detected measure received from the smoke detection sensor 410, the detected measure received from the carbon monoxide sensor 415, the detected temperature received from the temperature sensor 420, and any other data which may be relevant to the monitoring station 160 for determining the best course of action. The Wi-Fi module 440 may further receive messages from the monitoring station 160. The messages received from the monitoring station 160 are automatically passed to the processor 405 for execution. For example, depending on the values of battery level, date of production of the detector, the detected measure received from the smoke detection sensor 410, the detected measure received from the carbon monoxide sensor 415 and the detected temperature received from the temperature sensor 420, the monitoring station 160 may instruct the processor to actuate the exhaust fan 455 to perform one of several purging cycles before instructing the smoke detection sensor 410, the carbon monoxide sensor 415 and the temperature sensor 420 to detect new respective measures.

The RF proprietary module 445 wirelessly communicates with a setup box (not shown) wired to a router, where the router communicates with the monitoring station 160 using any type of proprietary protocol. The RF proprietary module 445 starts communicating with the monitoring station 160 by using the Monitoring station Address 1 corresponding to the RF proprietary module 445. When RF communication cannot be established using the Monitoring station Address 1 corresponding to the RF proprietary module 445, the RF proprietary module 445 communicates with the monitoring station 160 using the Monitoring station Address 2 corresponding to the RF proprietary module 445 stored in the memory 465. The RF proprietary module 445 reports to the processor 405 and to the monitoring station 160 that cellular communication using the Monitoring station Address 1 corresponding to the RF proprietary module 445 stored in the memory 465 could not be established or successfully completed. The messages generated by the processor 405 and sent by the RF proprietary module 445 to the monitoring station 160 comprise the Monitoring station Address (1 or 2) and the Device ID. The messages generated by the processor 405 and sent by the RF proprietary module 445 to the monitoring station 160 may further comprise one or several of the following: a House ID, a battery level, a date of production of the detector, the detected measure received from the smoke detection sensor 410, the detected measure received from the carbon monoxide sensor 415, the detected temperature received from the temperature sensor 420, and any other data which may be relevant to the monitoring station 160 for determining the best course of action. The RF proprietary module 445 may further receive messages from the monitoring station 160. The messages received from the monitoring station 160 are automatically passed to the processor 405 for execution. For example, depending on the values of battery level, date of production of the detector, the detected measure received from the smoke detection sensor 410, the detected measure received from the carbon monoxide sensor 415 and the detected temperature received from the temperature sensor 420, the monitoring station 160 may instruct the processor to actuate the exhaust fan 455 to perform one of several purging cycles before instructing the smoke detection sensor 410, the carbon monoxide sensor 415 and the temperature sensor 420 to detect new respective measures.

Although described as functioning independently in the previous paragraphs, the cellular module 435, the Wi-Fi module 440 and the RF proprietary module 445 could in fact be used concurrently to establish a communication with the monitoring station 160 in the most efficient manner. Upon successful establishment of the communication by one of the cellular module 435, the Wi-Fi module 440 and the RF proprietary module 445, the processor 405 may instruct the other modules to abort their effort of establishing a communication with the monitoring station 160.

Alternatively, the cellular module 435, the Wi-Fi module 440 and the RF proprietary module 445 could be configured to communicate with different instances of monitoring stations 160 (e.g. local and remote monitoring stations), depending on the severity of alarm, the severity of the situation etc. For doing so, the processor 405 may first instruct the Wi-Fi module 440 to establish a communication with a first instance of monitoring station 160 (local monitoring station), such as for example a security agency or a proprietary web service for low and medium severity alarms or low and medium severe situations. Should the situation escalate, or the alarm becomes high severity, the processor 405 may then additionally instruct the cellular module 435 to communicate with a second instance of monitoring station 160 (remote monitoring station), such as for example an emergency dispatch office or a public-safety answering point. In the event that the processor 405 determines that the detected measures warrant contacting directly a most proximate fire station, the processor 405 then instructs the RF proprietary module 445 to immediately communicate with the most proximate fire station, which coordinates may be stored in the memory 465 of the detector 105 for example upon installation, or remotely stored in the memory 465 of the detector 105 by the proprietary web service or security agency upon subscription to the service, or using an application installed on a mobile device (not shown) which communicates the processor 405 using an appropriate protocol and security level.

The processor 405 is also electrically connected to the data link 125 and receives the alarms from the wired detectors 130*a* and 130*b* electrically interconnected therewith. The processor 405 may also forward an alarm locally generated by the processor 405 or received through the 433/915 MHz wireless transceiver 430 to the wired detectors 130*a* and 130*b* on the data link 125. Messages exchanged through the data link 125 may include one or several of the following: an indication that the detected measure received from the smoke detection sensor 410 is above a predetermined threshold, an indication that the detected measure received from the carbon monoxide sensor 415 is above a predetermined threshold, and an indicator that the detected measure received from the smoke detection sensor 410 and the carbon monoxide sensor 415 are below the predetermined threshold.

The manual actuator 450 is mechanically connected directly or indirectly with the processor 405. The manual actuator 450 may consist for example of a button or a switch, provided on an exterior surface of the detector 105, to request the processor to temporarily deactivate the alarm module 460, and to postpone initiating communication with the monitoring station 160. In the event that the communication with the monitoring station 160 has already been established by the communication module 425, the processor 405 generates a message indicative of the reset for temporarily deactivating the alarm and request the module 435, 440 or 445 currently in communication with the detector 105 to transmit the message indicative of the reset. Alternatively, or concurrently, the processor 405 could send the message indicative of the reset through the data link 125 to the wired detectors 130*a* and 130*b*, and through the 433/915 MHz wireless transceiver 430 to the wireless detector 140.

Interaction Module 460

In addition to interconnecting with other detectors 130*a*, 130*b* and 140, and with the monitoring station 160, the detector 105 further assists in locating victims. The detector 105 assists in locating victims by detecting voice and reporting detected voice to the monitoring station 160. The detector 105 further assists in locating victims by providing audible or visual indicators to first respondents.

Figure 5A:
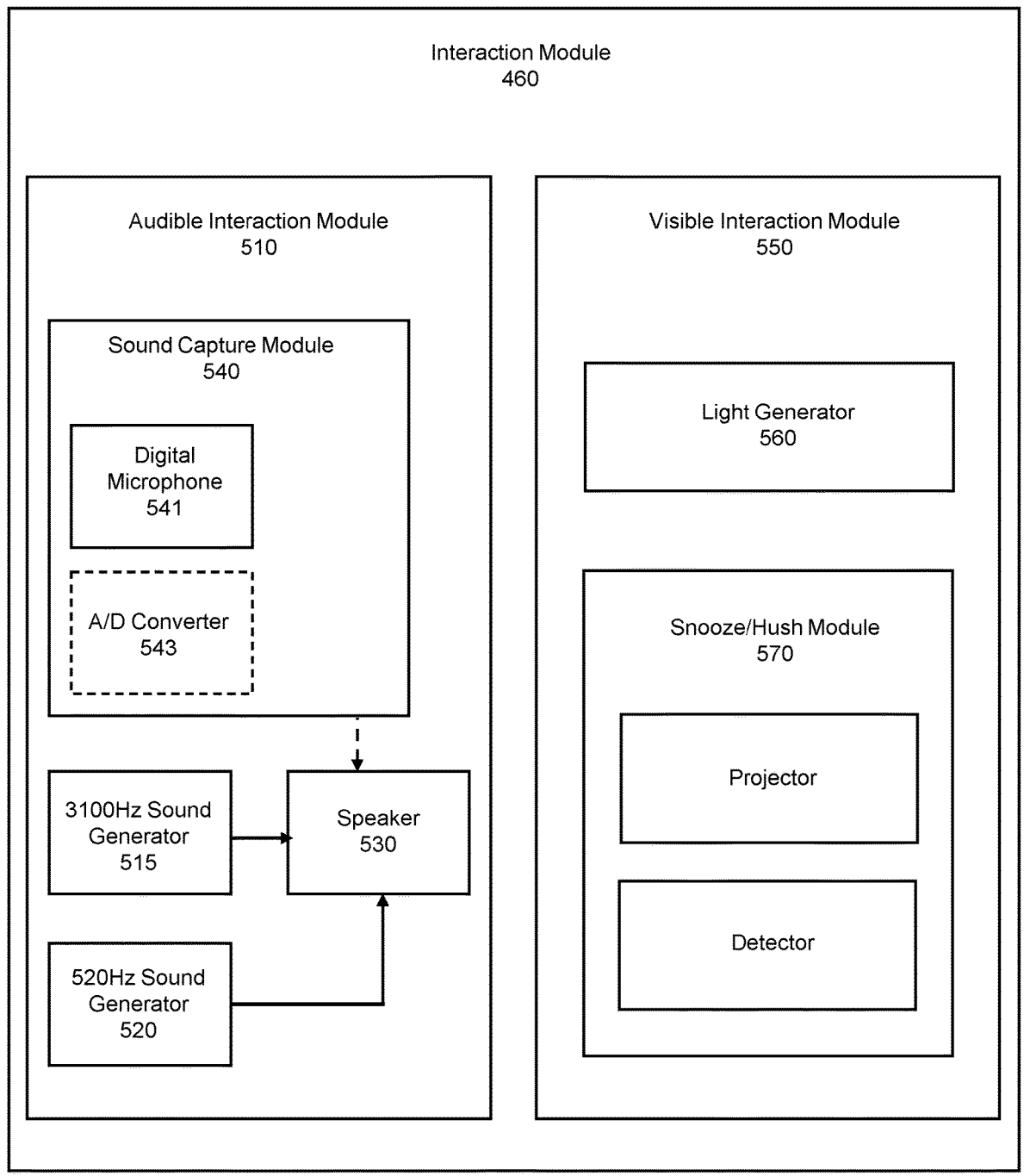
FIG. 5A is a block diagram of components of the interaction module 460 of FIG. 4 comprising a digital microphone.
Figure 5B:
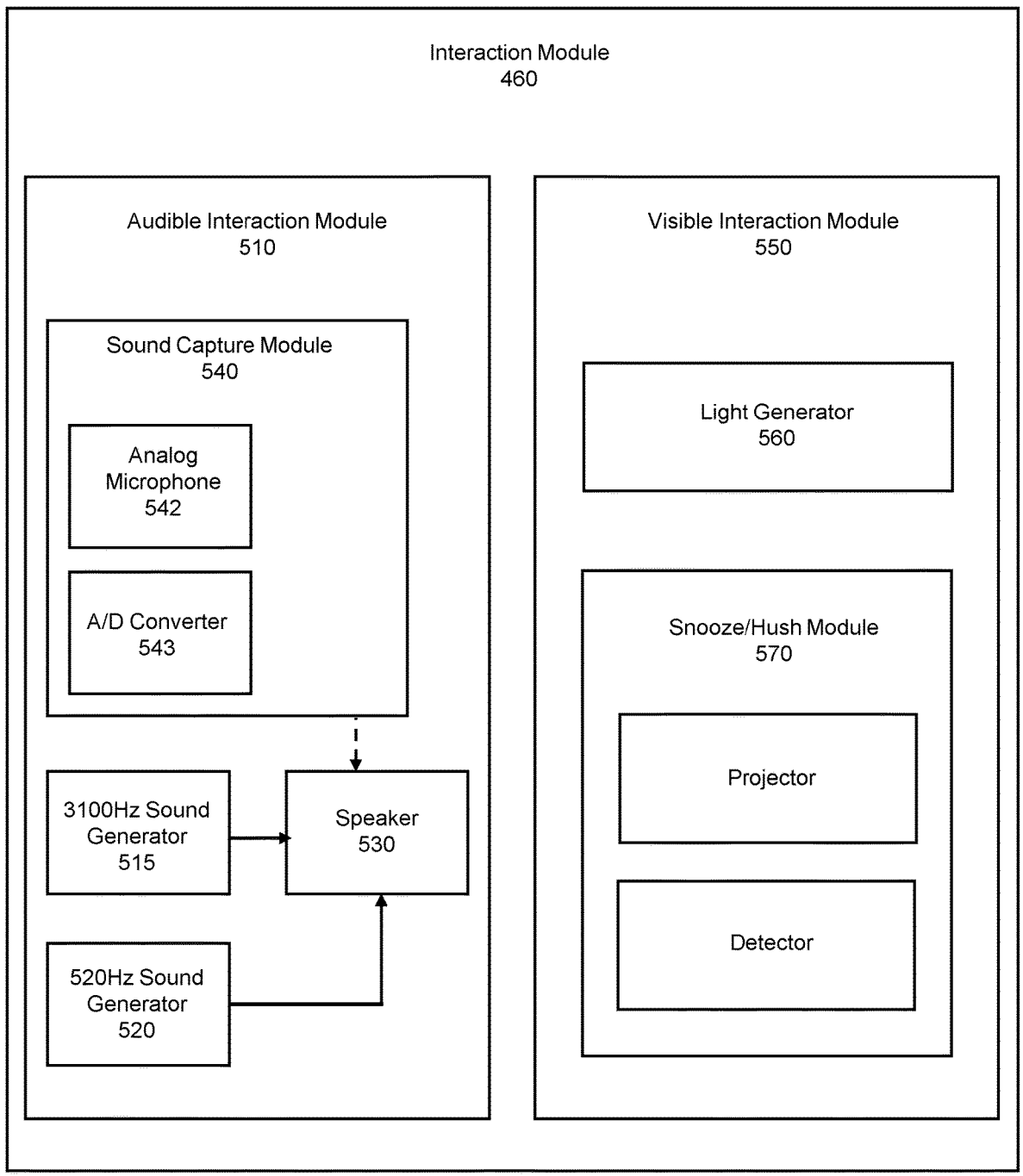
FIG. 5B is a block diagram of components of the interaction module 460 of FIG. 4 comprising an analog microphone.

Reference is now concurrently made to FIGS. 1-4, 5A and 5B, where FIGS. 5A and 5B represent a block diagram of components of the interaction module 460. The interaction module 460 communicates with and is controlled by the processor 405. The interaction module 460 allows the detector 105 and the monitoring station 160 to interact with one or several victims in the vicinity of detector 105, and to also interact with victims(s) in the vicinity of one of the other wired detectors 130*a*, 130*b* and wireless detector 140 through detector 105. The interaction module 460 and the processor 405 further allow the monitoring station 160 to interact with one or several victims in the vicinity of the detector 105, and to also interact with victims(s) in the vicinity of one of the wired detectors 130*a*, 130*b* and wireless detector 140 through detector 105.

The detector 105, through the interaction module 460 and the processor 405, further provides an audible and/or visual indicator to first respondents to assist in physically locating victim(s), by cooperating with the monitoring station 160 to modify the audible and/or visual indicators where presence of victim(s) in the vicinity of one of the detector 105, wired detectors 130*a* and/or 130*b* and wireless detector 140 have been detected.

The interaction module 460 comprises an audible interaction module 510 and may additionally comprise a visual interaction module 550. The remainder of the present description will describe the interaction module 460 comprising both the audible interaction module 510 and the visual interaction module 550 for exemplary purposes only.

The processor 405 controls the audible interaction module 510 and the visual interaction module 550. The audible interaction module 510 comprises a sound capture module 540, a 3100 Hz sound generator 515 for generating a 3100 Hz alarm signal, a 520 Hz sound generator 520 for generating a square wave 520 Hz alarm signal and a speaker 530. The speaker 530 is for example a built-in speaker, including a resonance chamber and an audio amplifier. The alarm signals respectively generated by the sound generators 515 and 520 are played by the speaker 530.

In a first implementation illustrated in FIG. 5A, the sound capture module 540 comprises a digital microphone 541. A sound captured by the digital microphone 541 is digitalized by the digital microphone 541 into a corresponding digitalized captured sound. Optionally, the sound capture module 540 also comprises an analog/digital converter 543 for digitalizing an analog sound received from a remote detector (e.g. 130a, 130b or 140). In a second implementation illustrated in FIG. 5B, the sound capture module 540 comprises an analog microphone 542 and an analog/digital converter 543. A sound captured by the analog microphone 542 is digitalized by the analog/digital converter 543 into a corresponding digitalized captured sound. The analog/digital converter 543 may also digitalize an analog sound received from a remote detector (e.g. 130a, 130b or 140). In the rest of the description, it is assumed that all the microphones used by the detectors (e.g. 105, 130a, 130b and 140) are either digital or analog. However, a person skilled in the art would readily understand that at least some of the functionalities supported by the presently described detectors may be adapted to an environment comprising a mix of digital and analog microphones.

The processor 405 instructs the sound capture module 540 to capture sounds in the vicinity of the detector 105. The processor 405 may instruct the sound capture module 540 to capture sounds in the vicinity of the detector 105 at regular interval from the moment one of the smoke detection sensor 410, the carbon monoxide sensor 415 or the temperature sensor 420 detects a measure above a predetermined threshold. Alternatively, the processor 405 may instruct the sound capture module 540 to capture sounds in the vicinity of the detector 105 at regular interval or at predetermined moments, from the moment one of the smoke detection sensor 410, the carbon monoxide sensor 415 and the temperature sensor 420 detects a measure above a threshold considered sufficiently severe to report to the monitoring station 160. In accordance with another alternative, the processor 405 may instruct the sound capture module 540 to capture sounds in the vicinity of the detector 105 upon receiving instructions to that effect from the monitoring station 160. The interval for capturing sounds in the vicinity of the detector 105 may be determined by the processor 405, based on the measures received from the smoke detection sensor 410, the carbon monoxide sensor 415, the temperature sensor 420, from the measures received from the interconnected detectors (e.g. 130a, 130b or 140), or from the monitoring station 160.

The digitalized captured sound generated by the sound capture module 540 is transmitted to the processor 405. The processor 405 receives the digitalized captured sound and generates a digital sound message based on the digitalized captured sound. The processor 405 wirelessly transmits the digital sound message to the monitoring station 160 via the communication module 425.

Various implementations of the digital sound message may be supported by the present disclosure. For example, the digital sound message is compliant with an IP protocol stack and comprises an IP layer (IPv4 or IPv6), a TCP layer, and a data layer transporting information sent by the detector 105 to the monitoring station 160. The information includes the digitalized captured sound. Alternatively, the processor 405 further processes the digitalized captured sound into a processed digitalized captured sound and the information includes the processed digitalized captured sound. Examples of further processing performed by the processor 405 includes compressing the digitalized captured sound, encrypting the digitalized captured sound, etc.

The digital sound message also includes a unique identifier of the detector 105. For example, if the communication module 425 includes a cellular module 435 used for transmitting the digital sound message to the monitoring station 160, the unique identifier may consist of an 8-digit Device ID, an IPv6 address or a SIM card number. In another example, if the communication module 425 includes a Wi-Fi module 440 used for transmitting the digital sound message to the monitoring station 160, the unique identifier may consist of an 8-digit Device ID or an IPv6 address.

As the detector 105 is adapted to be interconnected with the wired detectors 130a and 130b as well as with the wireless detector 140 (hereinafter referred as the interconnected detectors), the processor 405 is further adapted to instruct sound capture modules of the interconnected detectors to capture sounds in the vicinity of each such interconnected detector, and to relay the sounds detected by each interconnected detector to the monitoring station 160.

The detector 105 receives a captured sound from one of the interconnected detectors. The captured sound is received via the data link 150 (e.g. from detector 130a or 130b) or via the communication module 425 (e.g. from detector 140). In the following, the communication module 425 will be referred to as the wireless communication module 425 since it supports one or more wireless communication technology. In a particular configuration (not represented in the Figures for simplification purposes), the detector 105 includes the wireless communication module 425 but does not include the data link 150, in which case the detector 105 only interacts with interconnected detectors of the wireless type (e.g. 140).

In a first use case, the captured sound received from the interconnected detector is in analog format. The interconnected detector has an analog microphone and transmits the sound captured by its analog microphone to the detector 105 in analog format. The detector 105 comprises the analog/digital converter 543. The analog/digital converter 543 digitalizes the captured sound received from the interconnected detector into a digitalized captured sound.

In a second use case, the captured sound received from the interconnected detector is in digital format and is referred to as the digitalized captured sound. The interconnected detector has a digital microphone and transmits the sound captured by its digital microphone to the detector 105 in digital format. Alternatively, the interconnected detector has an analog microphone and an analog/digital converter, and transmits the sound captured by its analog microphone to the detector 105 in digital format after conversion by its analog/digital converter.

In both cases, the processor 405 receives the digitalized captured sound originating form the interconnected detector and generates a digital sound message based on the digitalized captured sound. The processor 405 wirelessly transmits the digital sound message to the monitoring station 160 via the wireless communication module 425. The generation of the digital sound message based on the digitalized captured sound originating form the interconnected detector (as well as the characteristics of the digital sound message) is similar to the previously described generation of the digital sound message based on the digitalized captured sound originating from the microphone (541 or 542) of the detector 105. The digital sound message also includes a unique identifier of the interconnected detector. For example, the unique identifier of the interconnected detector is transmitted by the interconnected detector to the detector 105 along with the captured sound originating form the interconnected detector. Optionally, the digital sound message also includes the unique identifier of the detector 105, to indicate that detector 105 acted as a relay from the interconnector detector to the monitoring station 160.

As voice from a victim may be captured by the detector 105 and one or several of the interconnected detectors concurrently, the processor 405 of the detector 105 may further synchronize capture of sounds by the sound capture module 540 of the detector 105 and the sound capture modules of the interconnected detectors, so as to pinpoint the proximity of the victim to one of the detector 105 or the interconnected detectors, based on amplitude of the sounds captured by the detector 105 and the interconnected detectors concurrently. Accordingly, the processor 405 may report the location of the victims to the monitoring station 160 (e.g. the identification of the detector 105 or one of the interconnected detectors from which the sound with the greatest amplitude was captured). The processor 405 may further transfer a digitalized captured sound corresponding to the greatest amplitude to the monitoring station 160, for allowing an operator at the monitoring station 160 to interact with the victims.

In a first use case, the detector 105 receives a remotely captured sound from one of the interconnected detectors. The interconnected detector has an analog microphone and transmits the remotely captured sound (captured by its analog microphone) to the detector 105 in analog format. The remotely captured sound is received via the data link 150 (e.g. from detector 130a or 130b) or via the wireless communication module 425 (e.g. from detector 140). The detector 105 comprises the analog microphone 542 and the analog/digital convertor 543. The analog microphone 542 captures a locally captured sound.

The analog/digital converter 543 compares an amplitude of a locally captured sound received from the analog microphone 542 to an amplitude of the remotely captured sound received from the interconnected detector, to identify the captured sound with the greatest amplitude. An identification of the captured sound with the greatest amplitude is transmitted by the analog/digital converter 543 to the processor 405. The processor 405 uses the identification transmitted by the analog/digital converter 543 to generate a probable location message including a unique identifier of the detector which captured the sound having the greatest amplitude.

Alternatively, the analog/digital converter 543 measures an amplitude of the locally captured sound received from the analog microphone 542 and an amplitude of the remotely captured sound received from the interconnected detector. The two measured amplitudes are reported to the processor 405. The processor 405 receives the amplitude of the locally captured sound and the amplitude of the remotely captured sound. The processor 405 determines therefrom the captured sound with the greatest amplitude. The processor 405 generates the probable location message including a unique identifier of the detector which captured the sound having the greatest amplitude.

If the locally captured sound has the greatest amplitude, the aforementioned unique identifier of the detector 105 is included in the probable location message. If the remotely captured sound has the greatest amplitude, the aforementioned unique identifier of the interconnected detector is included in the probable location message (the unique identifier of the interconnected detector is transmitted along with the remotely captured sound from the interconnected detector to the detector 105). The processor 405 wirelessly transmits the probable location message to the monitoring station 160 via the wireless communication module 425.

Optionally, the captured sound with the greatest amplitude is further converted into digital format by the analog/digital converter 543 and passed to the processor 405, to be included in the probable location message and transmitted to the monitoring station 160. If the remotely captured sound has the greatest amplitude, the analog/digital converter 543 converts the remotely captured sound into a remotely digitalized captured sound, which is included in the probable location message by the processor 405. If the locally captured sound has the greatest amplitude, the analog/digital converter 543 converts the locally captured sound into a locally digitalized captured sound, which is included in the probable location message by the processor 405.

In a second use case, the detector 105 receives a remotely captured sound in digital format from one of the interconnected detectors. The interconnected detector has an analog microphone and an analog/digital converter, and transmits the remotely captured sound (captured by its analog microphone) to the detector 105 in digital format after processing by its analog/digital converter. Alternatively, the interconnected detector has a digital microphone, and transmits the remotely captured sound (captured by its digital microphone) to the detector 105 in digital format. The remotely digitalized captured sound is received via the data link 150 (e.g. from detector 130a or 130b) or via the wireless communication module 425 (e.g. from detector 140). The detector 105 comprises the digital microphone 541 of FIG. 5A, or the analog microphone 542 and the analog/digital convertor 543 of FIG. 5B.

The processor 405 compares an amplitude of a locally digitalized captured sound generated by the sound capture module 540 to an amplitude of the remotely digitalized captured sound received from the interconnected detector, to identify the digitalized captured sound with the greatest amplitude. The processor 405 generates a probable location message including a unique identifier of the detector which captured the sound having the greatest amplitude.

If the locally digitalized captured sound has the greatest amplitude, the aforementioned unique identifier of the detector 105 is included in the probable location message. If the remotely digitalized captured sound has the greatest amplitude, the aforementioned unique identifier of the interconnected detector is included in the probable location message (the unique identifier of the interconnected detector is transmitted along with the remotely digitalized captured sound from the interconnected detector to the detector 105). The processor 405 wirelessly transmits the probable location message to the monitoring station 160 via the wireless communication module 425.

Optionally, the digitalized captured sound with the greatest amplitude is further included in the probable location message and transmitted to the monitoring station 160. If the remotely digitalized captured sound has the greatest amplitude, the remotely digitalized captured sound is included in the probable location message by the processor 405. If the locally digitalized captured sound has the greatest amplitude, the locally digitalized captured sound is included in the probable location message by the processor 405.

The processor 405 may further determine based on the digitalized captured sound whether the captured sound corresponds to voice. An indication that a sound corresponding to voice has been captured is further included in the message (e.g. digital sound message or probable location message) transmitted to the monitoring station 160 when appropriate. Alternatively, the processor 405 may be further adapted to filter the sounds captured by the microphones of the detector 105 (541 or 542) and the microphones of the interconnected detectors, so that only captured sounds corresponding to voice are transmitted to the monitoring station 160 (a captured sound not identified as corresponding to voice is not transmitted to the monitoring station 160). The captured sounds may be filtered based on frequency for example. Alternatively, and to limit the processing required by the processor 405, the microphone (e.g. 541 or 542) of the detector 105 as well as the microphones of the interconnected detectors could be selected for intrinsically limiting sounds captured to the frequency range of human voice.

Once the processor 405 determines that voice has been captured, by one of the microphone (e.g. 541 or 542) of the detector 105 or the microphone of one of the interconnected detectors, the processor 405 initiates the locating of the victims, by synchronizing the capturing of sounds by the microphone (e.g. 541 or 542) of the detector 105 and the microphones of the interconnected detectors. For example, the synchronization may consist in instructing the microphone (e.g. 541 or 542) of the detector 105 and the microphone of the interconnected detectors to capture sounds at the same moment. To ensure that sound from the various victims may be captured, the processor 405 may instruct the victims to yell their name when a visual or audible signal is generated by the detector 105 and the interconnected detectors. Using both audible and visual indicators thus assists the processor 405 in locating victims more accurately, and thereby assists the first respondents in their work of rescuing victims. The synchronization between the detector 105 and the wired detectors 130a and 130b is performed through the wired link 125. The synchronization between the detector 105 and the wireless detector 140 is performed through a wireless link using the wireless communication module 425.

Emergency situations are particularly stressful for many victims, and audible and/or visual indicators generated under the control of the processor 405 may further assist in actions to be taken. For example, the processor 405 may act as a relay between the monitoring station 160 and the victims, by providing audible and/or visual guidance of actions to be taken. The guidance provided by the monitoring station 160 is based on the measures received by the smoke detection sensor 410, the carbon monoxide sensor 415, the temperature sensor 420, the voice captured by the microphone (e.g. 541 or 542) of the detector 105, and the measures and voice captured by the interconnected detectors; which are all relayed by the processor 405 to the monitoring station 160. For instance, in an exemplary implementation, the aforementioned digital sound message transmitted to the monitoring station 160 further includes one or more detected measure generated by at least one of the smoke detection sensor 410, the carbon monoxide sensor 415 and the temperature sensor 420. In a typical emergency situation, the monitoring station 160 is limited to the alarms received from the detector 105 and the interconnected detectors, as well as video feeds from cameras when such cameras are provided. However, it has been proven repeatedly that cameras are blinded by smoke, dust, debris, etc. Thus, the present detector 105 provides a great improvement in locating victims based on captured sounds.

In addition to confirming the presence of victims at certain locations, the detector 105 may further assist first respondents in reaching victims faster. Once victims are located by the detector 105 and/or the interconnected detectors, the monitoring station 160 may actuate a retrieval protocol for first respondents. Instead of only proceeding to victim location in a predetermined sequence, the first respondents may operate on both fronts concurrently: some first respondents follow the predetermined sequence to ensure that unconscious victims may be located, while other respondents are directed by the interaction module 460 to the location of victims as determined by the processor 405. This approach ensures faster assistance to conscious victims, while unconscious victims are also searched in a traditional manner. The processor 405 may thus receive from the monitoring station 160 instructions to initiate support to first respondents. The support to first respondents may take several forms.

The processor 405 may receive through the communication module 425 audible alarm instructions from the monitoring station 160. For example, the monitoring station 160 may instruct the processor 405 to actuate the audible interaction module 510 and provide instructions on the audible alarm signal to be used (e.g. actuate one of sound generator 515 and 520). The monitoring station 160 may also instruct the processor 405 to use an audible alarm signal (e.g. an audio message) provided by the monitoring station 160 through the communication module 425. In both cases, the audible alarm signal is played by the speaker 530.

The processor 405 may additionally or alternatively receive through the communication module 425 visual alarm instructions from the monitoring station 160. For example, the monitoring station 160 may instruct the processor 405 to actuate the visual interaction module 550 and provide instructions on the visual alarm to be used. The visual interaction module 550 comprises a light generator 560 and a snooze/hush module 570. The light generator 560 may comprise one or several lights, such as for example Light Emitting Diode(s). The light generator 560 generates the visual alarm signal as instructed by the processor 405. For example, the processor 405 may instruct the light generator 560 to actuate one or several lights separately, concurrently or alternately. Intensity and color of the light generated by the light generator 560 could further be selected by the processor 405 and/or by the monitoring station 160 when assisting first respondents in locating victims based on the sounds captured by the detector 105 and/or the interconnected detectors.

With respect to the snooze/hush module 570, an example of operations of the snooze/hush module 570 is detailed in U.S. patent application Ser. No. 16/158,488.

The processor 405 is further adapted for acting as an intermediate between the monitoring station 160 and the interconnected detectors, so as to assist the first respondents. To that effect, the processor 405 applies the instructions and messages received from the monitoring station 160, to the interaction module 460, but further relays the messages and instructions received from the monitoring station 160 to the interconnected detectors. As the interconnected detectors may not have the capabilities to convert digital messages received from the monitoring station 160, the processor may further instruct the analog/digital converter 543 to convert the digital messages received from the monitoring station 160 into an analog message that may be played directly by a speaker of the interconnected detectors.

The present detector 105 thus greatly increases the interaction capabilities with both victims, the monitoring station 160 and the first respondents.

Although not specifically mentioned, implementation of the present detector 105, sequence and timing of tasks performed by the processor 405 are performed in conformity with applicable UL/Underwriters Laboratories of Canada (ULC) standards.

Figure 6A:
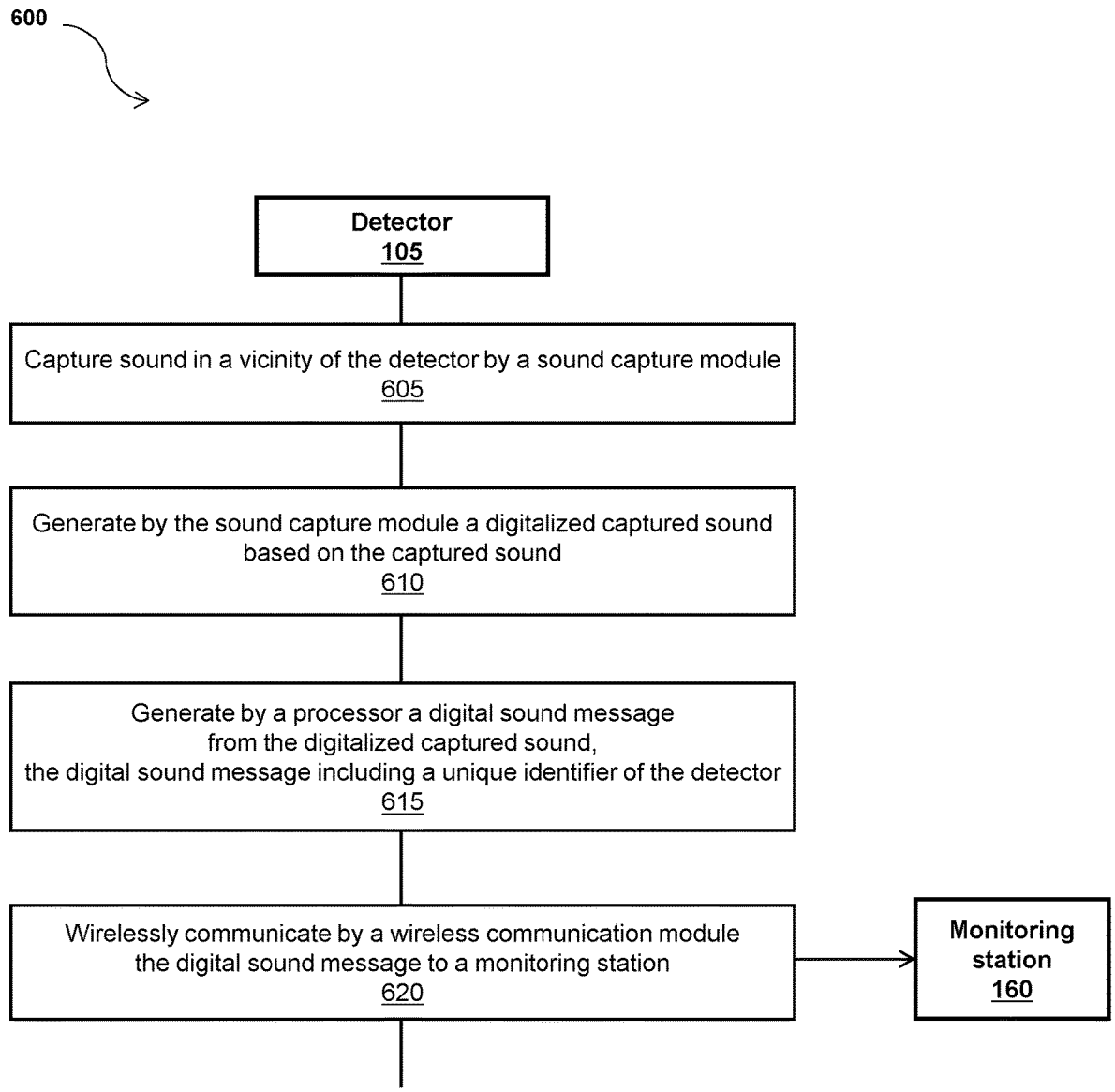
FIGS. 6A, 6B and 6C represent a method for providing locating capabilities to the detector 105.
Figure 6B:
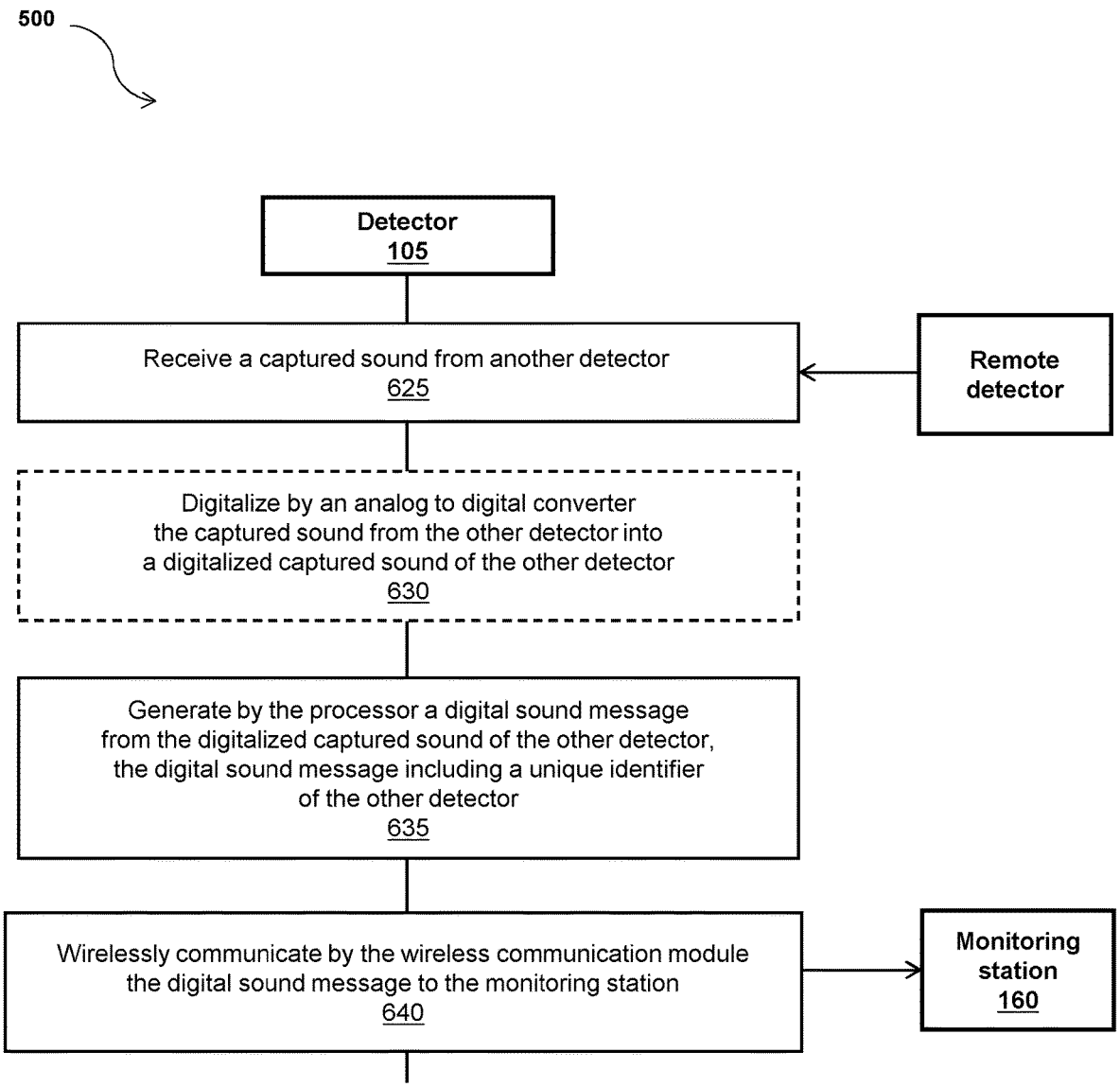
Figure 6C:
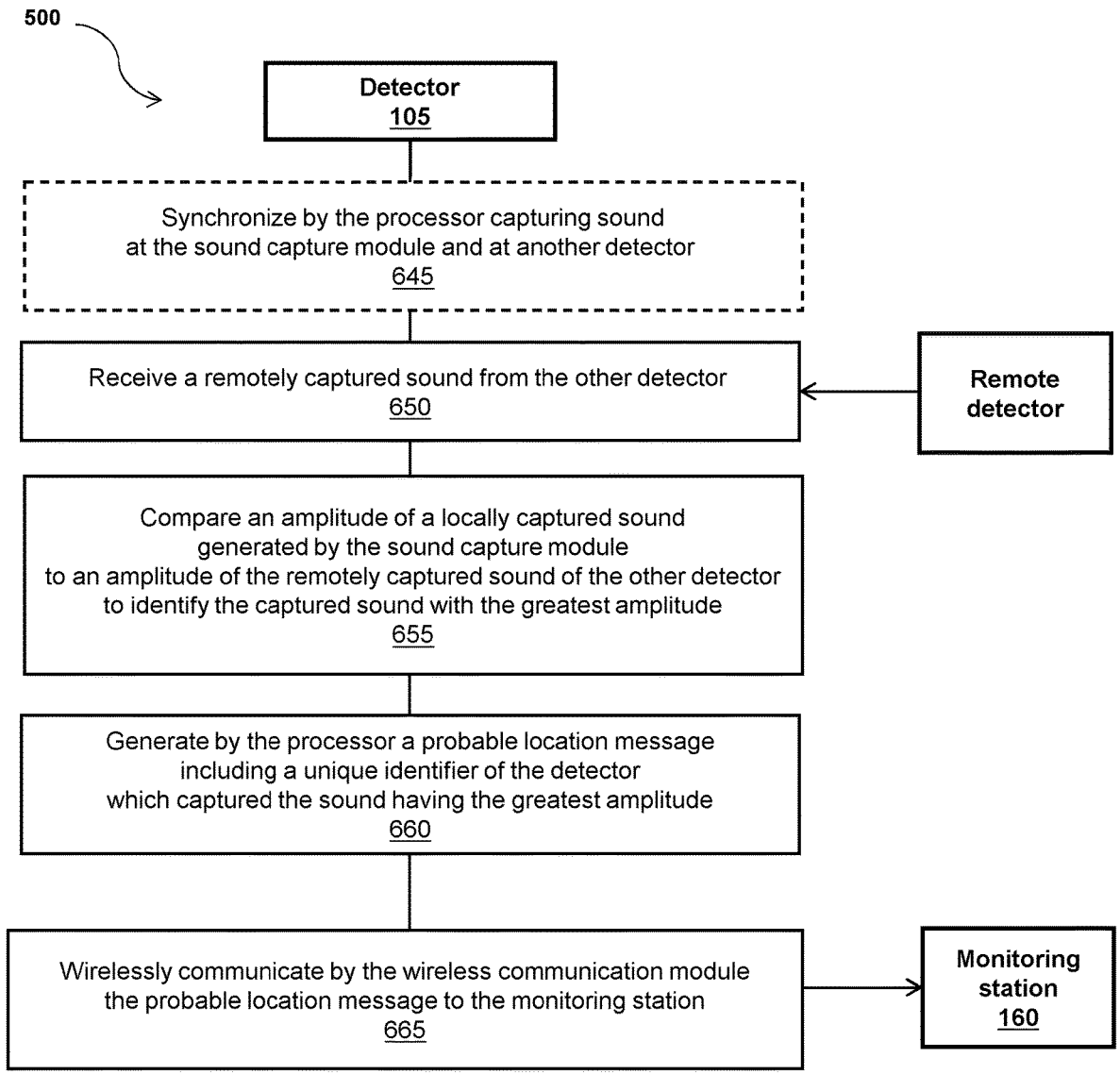

Reference is now concurrently made to FIGS. 1, 4, 5A, 5B, 6A, 6B and 6C, where FIGS. 6A, 6B and 6C represent a method 600 for providing locating capabilities to the detector 105. The steps of the method 600 are implemented by several components of the detector 105 represented in FIGS. 4, 5A and 5B.

The method 600 comprises the step 605 of capturing sound in a vicinity of the detector 105. Step 605 is executed by the sound capture module 540.

The method 600 comprises the step 610 of generating a digitalized captured sound based on the sound captured at step 605. Step 610 is executed by the sound capture module 540.

The method 600 comprises the step 615 of generating a digital sound message from the digitalized captured sound (generated at step 610), the digital sound message including a unique identifier of the detector 105. Step 615 is executed by the processor 405.

The method 600 comprises the step 620 of wirelessly communicating the digital sound message with the unique identifier of the detector 105 (generated at step 615), to the monitoring station 160. Step 620 is executed by the wireless communication module 425.

Optionally, the method 600 comprises the following steps which may be performed simultaneously or sequentially to steps 605-620.

The method 600 comprises the step 625 of receiving a captured sound from another detector. The captured sound is received via the wireless communication module 425 (e.g. from the wired detector 140) or via the data link 125 (e.g. from the wireless detector 130*a* or 130*b*).

If the captured sound from the other detector consists of a digitalized captured sound of the other detector, step 635 is directly executed. Otherwise (if the captured sound from the other detector is analog), the optional step 630 is executed.

The method 600 comprises the optional step 630 of digitalizing by the analog to digital converter 543 the captured sound from the other detector into a digitalized captured sound of the other detector.

The method 600 comprises the step 635 of generating a digital sound message from the digitalized captured sound of the other detector, the digital sound message including a unique identifier of the other detector. Step 635 is executed by the processor 405.

The method 600 comprises the step 640 of wirelessly communicating the digital sound message with the unique identifier of the other detector (generated at step 635), to the monitoring station 160. Step 640 is executed by the wireless communication module 425.

Optionally, the method 600 comprises the following steps which may be performed simultaneously or sequentially to steps 605-620.

The method 600 comprises the optional step 645 of synchronizing capturing sound at the sound capture module 540 of the detector 105 and at another detector (e.g. 103*a*, 130*b* or 140). Step 645 is executed by the processor 405.

The method 600 comprises the step 650 of receiving a remotely captured sound from the other detector. The captured sound is received via the wireless communication module 425 (e.g. from the wired detector 140) or via the data link 125 (e.g. from the wireless detector 130*a* or 130*b*).

The method 600 comprises the step 655 of comparing an amplitude of a locally captured sound generated by the sound capture module 540 to an amplitude of the remotely captured sound of the other detector, to identify the captured sound with the greatest amplitude. The implementation of step 655 has been detailed previously and may vary based on the nature (analog or digital) of the locally and remotely captured sounds.

The method 600 comprises the step 660 of generating a probable location message including a unique identifier of the detector which captured the sound having the greatest amplitude (identified at step 655). Step 660 is executed by the processor 405.

The method 600 comprises the step 665 of wirelessly communicating the probable location with the unique identifier of the detector which captured the sound having the greatest amplitude, to the monitoring station 160. Step 665 is executed by the wireless communication module 425.

If the captured sound with the greatest amplitude consists of a digitalized captured sound with the greatest amplitude, then the digitalized captured sound with the greatest amplitude is optionally included (by the processor 405) to the probable location message.

If the captured sound with the greatest amplitude is in analog format, then the captured sound with the greatest amplitude is optionally digitalized by the analog to digital converter 543 into the digitalized captured sound with the greatest amplitude, and the digitalized captured sound with the greatest amplitude is further optionally included (by the processor 405) to the probable location message.

Additional details relative to the implementation of the steps of the method 600 have been described previously, in relation to FIGS. 4, 5A and 5B.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A detector comprising:
   a sound capture module comprising an analog microphone for locally capturing sound in a vicinity of the detector, the sound capture module further comparing the locally captured sound with a remotely captured sound received from a remote detector to identify the captured sound with the greatest amplitude;
   a processor for receiving an identification of the captured sound with the greatest amplitude and for generating a probable location message including a unique identifier of the detector which captured the sound having the greatest amplitude; and
   a wireless communication module for wirelessly communicating the probable location message to a monitoring station.

2. The detector of claim 1, wherein the sound capture module further comprises an analog to digital converter for digitalizing the captured sound with the greatest amplitude into a digitalized captured sound.

3. The detector of claim 2, wherein the remotely captured sound is received via one of the wireless communication module or a data link connecting the detector to the other detector
   the processor the digitalized captured sound with the greatest amplitude.

4. The detector of claim 2, wherein the captured sound having the greatest amplitude is digitalized by the analog to digital converter and the digitalized captured sound with the greatest amplitude is included by the processor to the probable location message.

5. The detector of claim 2, wherein the processor synchronizes capturing sound at the analog microphone and at the other detector.

6. The detector of claim 1, wherein the processor analyzes the digitalized captured sound with the greatest amplitude and verifies whether the digitalized captured sound with the greatest amplitude corresponds to voice; and when the digitalized captured sound with the greatest amplitude corresponds to voice, the processor includes an indication in the probable location message to the effect that the digitalized sound with the greatest amplitude corresponding to voice has been captured by the detector.

7. A detector comprising:
a sound capture module generating a digitalized captured sound, the sound capture module comprising a digital microphone for capturing sound in a vicinity of the detector and generating a digitalized locally captured sound;
a processor for receiving the digitalized locally captured sound and a digitalized remotely captured sound from another detector, the processor comparing the digitalized locally captured sound with the digitalized remotely captured sound received to identify the captured sound with the greatest amplitude, the processor generating a probable location message including a unique identifier of the detector which captured the sound with the greatest amplitude; and
a wireless communication module for wirelessly communicating the probable location message to a monitoring station.

8. The detector of claim 7, wherein the digitalized captured sound with the greatest amplitude is included by the processor to the probable location message.

9. The detector of claim 7, wherein the processor synchronizes capturing sound at the sound capture module and at the other detector.

10. The detector of claim 7, wherein the processor analyzes the digitalized captured sound with the greatest amplitude and verifies whether the digitalized captured sound with the greatest amplitude corresponds to voice; and when the digitalized captured sound with the greatest amplitude corresponds to voice, the processor includes an indication in the probable location message that sound corresponding to voice has been captured by the detector.

11. The detector of claim 7, wherein the detector further comprises:
an interaction module for allowing the monitoring station to communicate with a victim in the vicinity of the detector.

12. The detector of claim 11, wherein:
the interaction module comprises a speaker, and
the wireless communication module receives from the monitoring station an audio message to be played by the speaker.

13. The detector of claim 11, wherein the interaction module comprises an audible interaction module and a visual interaction module, and the monitoring station interacts with the victim using at least one of the audible interaction module and visual interaction module.

14. The detector of claim 7, wherein the detector further comprises at least one of a smoke detection sensor, a carbon monoxide sensor and a temperature sensor, the at least one smoke detection sensor, carbon monoxide sensor and temperature sensor generating a detected measure to be included by the processor to the probable location message wirelessly communicated to the monitoring station by the wireless communication module.

15. The detector of claim 7, wherein:
the wireless communication module comprises a cellular module;
the detector has a unique identifier, the unique identifier is one of: an 8-digit Device ID, an IPv6 address, and a Subscriber Identity Module (SIM) card number; and
the wireless communication module wirelessly communicates with the monitoring station using one of the following standards: GSM, 2G, 3G, 4G, 5G, or LTE.

16. The detector of claim 15, further comprising:
a memory for storing a first monitoring station address for the monitoring station; and wherein:
the cellular module communicates with the monitoring station using the first monitoring station address.

17. The detector of claim 16, wherein:
the memory further stores a second monitoring station address for the monitoring station;
the cellular module communicates with the monitoring station using the second monitoring station address when a communication with the monitoring station using the first monitoring station address is not established; and
the cellular module reports to the processor that the communication using the first monitoring station address for the monitoring station is not established.

18. The detector of claim 7, wherein:
the wireless communication module comprises a Wi-Fi module;
the detector has a unique identifier, the unique identifier is one of: an 8-digit Device ID and an IPv6 address;
the detector further comprises a memory for storing an IP address for the monitoring station; and
the wireless communication module wirelessly communicates with the monitoring station using one of the following protocols: IPv4, IPv6, a monitoring station standard protocol, an Ethernet protocol or a proprietary protocol.

19. The detector of claim 7, wherein the detector communicates with both a local monitoring station and a remote monitoring station.

20. A method for providing locating capabilities to a detector, the method comprising:
capturing local sound in a vicinity of the detector by a sound capture module of the detector;
generating by the sound capture module a digitalized locally captured sound for the locally captured sound;
receiving a digitalized remotely captured sound from another detector;
comparing by a processor of the detector an amplitude of the digitalized locally captured sound to an amplitude of the digitalized remotely captured sound of the other detector to identify the captured sound with the greatest amplitude;
generating by the processor a probable location message, the probable location message including a unique identifier of the detector which captured the sound having the greatest amplitude; and
wirelessly communicating by a wireless communication module of the detector the probable location message with the unique identifier of the detector which captured the sound having the greatest amplitude to a monitoring station.

21. The method of claim 20, wherein the digitalized captured sound with the greatest amplitude is included by the processor to the probable location message.

22. The method of claim 20, further comprising synchronizing by the processor capturing sound at the sound capture module of the detector and at the other detector.

* * * * *